2,926,119

QUATERNARY AMMONIUM BACTERICIDES

Warren D. Niederhauser, Huntsville, Ala., assignor to Rohm & Haas Company, Philadelphia, Pa., a corporation of Delaware No Drawing. Application May 2, 1958
Serial No. 732,416

6 Claims. (Cl. 167—30)

This invention deals with a method for treating water especially hard water with a specific quaternary ammonium compound having the formula

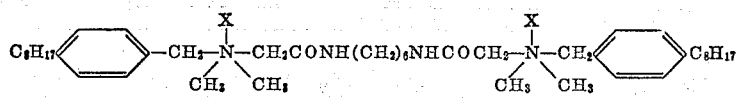

in which X is a halogen having an atomic weight of about 35.5 to 127, i.e., chlorine, bromine or iodine. These compounds are excellent, rapid bactericides, even at considerable dilutions, against many different types of bacteria. They are especially valuable as bactericides in hard water where apparently their bactericidal properties are unimpaired by the presence of hard water components. This is a surprising result in the light of the fact that compounds somewhat similar structurally to the subject compound, although quite bactericidal in normal residential and industrial waters have significantly reduced bactericidal activity in very hard waters. The reduction in bactericidal activity, in very hard waters of the somewhat structurally similar known compounds, is so marked that standards set by the United States Department of Health, Education and Welfare for certain sanitation applications are not met.

It is the principal object of the present invention to provide a method for treating water with a compound that has valuable bactericidal properties that are substantially unimpaired even in the presence of very hard waters. It is also an object to provide a method using specific compounds that perform in satisfactory compliance with the standards of the U.S. Department of Health, Education and Welfare in certain sanitation applications such as the sanitizing of food utensils particularly the presence of waters of considerable hardness. Other objects and advantages will be apparent hereinafter.

This application is a continuation-in-part of my co-pending application Serial No. 465,738, filed October 29, 1954, now abandoned.

The compounds used in the present method may be prepared preferably in one of two ways. In one case, octylbenzyl halide is reacted with $\alpha,\omega$-bis(N,N'-dimethylaminoacetamido)hexane. Alternatively, these compounds may be prepared by reacting octylbenzyldimethylamine with hexamethylene bis(haloacetamide).

The reactants, set forth above, are known or prepared by known methods. Illustrative methods of preparing the reactants that may be employed to make the compounds used in the present method are shown in the following preparations in which parts by weight are employed throughout.

PREPARATION A

There were added together in a reaction vessel 95 parts of octylbenzene, 120 parts of glacial acetic acid, 30 parts of paraformaldehyde, and 54 parts of anhydrous zinc chloride. Hydrogen chloride was fairly rapidly introduced into the reaction mixture for a period of two hours, during which time the temperature of the system was maintained at about 50° C. The reaction mixture formed layers which were separated. The upper layer was washed with hot water, aqueous 10% sodium bicarbonate solution, and again with hot water. This layer was then dried over sodium sulfate and distilled. The product distilled at 119 to 121° C. at 1 mm. and was identified as octylbenzyl chloride.

PREPARATION B

A solution of eight parts of sodium hydroxide and 30 parts of water was introduced into a reaction vessel. There was added 22.5 parts of an aqueous 40% dimethylamine solution and 23.9 parts of octylbenzyl chloride. The reaction mixture was heated to give gentle refluxing in a condenser cooled by Dry Ice and acetone. Dimethylamine was slowly passed into the mixture over a period of three hours. The reaction mixture was allowed to return to room temperature during which time layers formed. The layers were separated and the product layer was washed with water until neutral to litmus. The product was heated under reduced pressure and identified as octylbenzyldimethylamine.

PREPARATION C

A mixture of 147 parts of anhydrous potassium acetate, 75 parts of glacial acetic acid, and 75 parts of water was added to a reaction vessel. There was slowly added to the reaction mixture 58 parts of hexamethylenediamine and 165 parts of chloroacetyl chloride during which time the system was cooled. The reaction mixture was stirred for three hours and then 520 parts of an aqueous 25% sodium hydroxide solution was added making the mixture slightly alkaline. The mixture was cooled and the product separated as crystals. The product was filtered off, recrystallized, and identified as hexamethylene bis(chloroacetamide).

PREPARATION D

There were added together 40 parts of an aqueous 25% sodium hydroxide solution, 22.5 parts of an aqueous 40% dimethylamine solution and 135 parts of hexamethylene bis(chloroacetamide). The reaction mixture was heated gently to reflux under a condenser cooled by Dry Ice and acetone. The system was allowed to return to room temperature. The product was separated and identified as $\alpha,\omega$-bis(N,N'-dimethylaminoacetamido)hexane.

Reaction between octylbenzyl halide and $\alpha,\omega$-bis(N,N'-dimethylaminoacetamido)hexane yields the quaternary ammonium compound used in this invention. The same result is obtained by reacting octylbenzyldimethylamine and hexamethylene bis(haloacetamide). Both reactions are quite satisfactory and produce substantially quantitative results. The choice of the particular reaction employed is entirely a matter of convenience. Actually, both reactions are run under similar conditions. The reactions are preferably conducted by adding the reactants together in the presence of a volatile inert organic solvent such as acetonitrile, formamide, nitromethane, benzene, toluene, xylene, isopropanol, butanol, isopropyl ether, or the like. Reaction temperatures in the range of about 20 to 150° C. are recommended for optimum results. It is frequently advantageous to run the reactions at the reflux temperature of the reaction mixtures. The reactions are substantially complete in about two to four hours depending mostly on the temperatures employed. The solid product is readily separable from the reaction mixture by filtration. It may then be recrystallized, if desired, or merely dried, such as under reduced pressure. The product is a white crystalline solid which may be named hexamethylene bis(octylbenzyldimethylammonium halide acetamide).

The compounds used in the method of the present invention may be prepared in the following illustrative manner in which parts by weight are used throughout.

*Example*

A mixture of 13.45 parts of hexamethylene bis(chloroacetamide), 24.7 parts of octylbenzyldimethylamine, and 45 parts of acetonitrile was added to a flask equipped with a stirrer, thermometer, and reflux condenser. The reaction mixture was heated under reflux, which was at about 85° C., for a period of four hours. The reaction mixture was then allowed to cool to 25° C. A white crystalline solid formed that was separated by filtration, recrystallized from isopropanol, and dried under reduced pressure. The product contained 9.2% ionic chlorine (9.3% theoretical). The product was identified as hexamethylene bis(octylbenzyldimethylammonium chloride acetamide).

The same result was obtained by reacting octylbenzyl chloride and α,ω-bis(N,N'-dimethylaminoacetamido)hexane under conditions similar to those employed above. In a similar manner the corresponding bromide and iodide compounds are prepared.

The effectiveness of the present method was substantiated by the standard Chambers Modification of the Weber-Black Test (Weber, G. R. and Black, L. A.—Journal of the American Public Health Association 38, 1405 (1948), which consists of introducing bacteria, in a known amount, into a predetermined volume of water, then adding a known concentration of the specific bactericide to be used, and, finally, determining the percentage of bacteria killed at certain specified intervals of time. Usually 100 milliliters of test solution is employed consisting of one milliliter of the inoculum, one milliliter of an aqueous solution of the bactericide used, and the remainder of water. The bacteria employed is present in the amount of at least 200,000,000 per milliliter of test solution. The bactericide is added at any desired concentration. The water employed may be distilled or natural water. In the present evaluation, 100 milliliters of test solution was employed containing Escherichia coli USPHS #198 strain—ATCC #11229 in an amount to give 200,000,000 bacteria per milliliter of the test solution at the start of the test, one milliliter of the specific bactericide used in an amount to give 200 parts per million of the test solution, and the remainder of natural hard waters. The hard waters employed, along with their hardnesses equivalent to parts per million as calcium carbonate, were: St. Louis, Missouri, 100; Cincinnati, Ohio, 160; and Ardsley, Pennsylvania, 450. These waters were selected because of their known hardness characteristics, since it is generally considered that a water having a hardness equivalent to more than about 50 parts per million as calcium carbonate is a hard water.

In the following table there are shown the results of employing the method of the present invention which encompasses the use of a specific bis quaternary ammonium previously defined in the amount previously mentioned. The present method is identified as Method A and the particular bis quaternary ammonium compound used was the one in the chloride form. Similar results are obtained when the bromide or iodide counterpart is employed. In contrast, in the same table are shown under Method B the results when ethylene bis-(octylbenzyldimethylammonium chloride acetamide) was used instead of the bis quaternary ammonium compound employed in Method A. Results similar to those of Method B are obtained when propylene bis(octylbenzyldimethylammonium chloride acetamide) is used in place of the ethylene counterpart previously mentioned.

TABLE

| Method | Conc. of Cpd. in p.p.m. | Water Used | Percentage of Bacteria Killed After 15 Seconds |
|---|---|---|---|
| A | 200 | St. Louis, Mo | 100 |
| B | 200 | do | 99.9916–99.9929 |
| A | 200 | Cincinnati, O | 99.9999+ |
| B | 200 | do | 96.9688–99.9841 |
| A | 200 | Ardsley, Pa | 99.9999+ |
| B | 200 | do | [1] TNC |

[1] Too numerous to count.

The above table shows the rapid and effective bactericidal effects of the present method. After a thirty second time interval the present method shows a one hundred percent kill in all instances. In contrast, Method B is sluggish and ineffective particularly in the hardest water and even at a thirty second time interval is unable to meet the standards of the U.S. Department of Health, Education and Welfare because a significant number of Escherichia coli remains alive. Furthermore, the present method is effective even when the required bis quaternary ammonium compound is present in amounts less than 200 p.p.m. While 100 p.p.m. is useful, a concentration of at least about 200 p.p.m. is used in most instances for safety reasons. Of course, the concentration may be varied with an appreciable range according to the situation confronted as will be apparent to one skilled in the art. A bactericidal effect will be observed even at great dilutions and even in the presence of very hard waters. While the present method is especially effective against bacteria, particularly Escherichia coli advantageous results are observed against fungi, particularly against Stemphylium sarcinaeforme and Monilinia fructicola. However, the outstanding utility of the present method lies in its effect against Escherichia coli. This is a very important characteristic particularly since it is well known that Escherichia coli, whose presence in water is an indication of fecal pollution, causes many infections such as in the kidneys, urinary bladder, and gall bladder, among others. This strong bactericidal activity of the present method, even in the presence of the hardest of waters, is quite unexpectedly advantageous particularly in the light of the performance of Method B which uses a compound of somewhat similar skeletal shape. This surprising bactericidal acivity makes the present method a very effective weapon for the control of Escherichia coli even in the hardest of waters.

I claim:

1. A method for controlling bacteria in aqueous systems comprising adding to an aqueous system a bactericidal amount of the compound having the formula

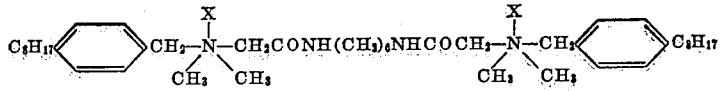

in which X is a halogen having an atomic weight of 35.5 to 127.

2. A method for controlling bacteria in aqueous systems comprising adding to an aqueous system a bactericidal amount of the compound having the formula

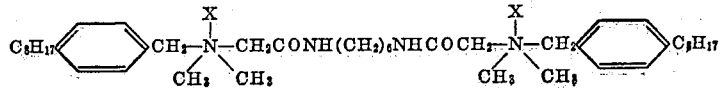

3. A method for controlling bacteria in aqueous systems comprising adding to an aqueous system a bactericidal amount of the compound having the formula

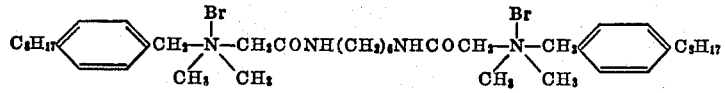

4. A method for controlling *Escherichia coli* in aqueous systems which comprises adding to the aqueous system a bactericidal amount of the compound having the formula

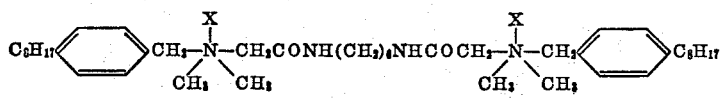

in which X is a halogen having an atomic weight of 35.5 to 127.

5. A method for controlling *Escherichia coli* in the presence of hard water which comprises introducing a bactericidal amount of the compound having the formula

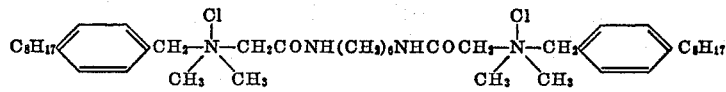

into said hard water.

6. A method for controlling *Escherichia coli* in the presence of hard water containing hardness equivalent to at least about 50 parts per million as calcium carbonate which comprises introducing the compound having the formula

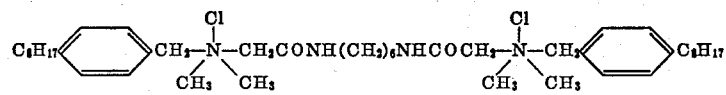

in the amount of at least about 200 parts per million, into said hard water.

References Cited in the file of this patent
UNITED STATES PATENTS 2,569,409    De Bennesville _____ Sept 25, 1951

UNITED STATES PATENT OFFICE
Certificate of Correction

Patent No. 2,926,119  February 23, 1960

Warren D. Niederhauser

It is hereby certified that error appears in the printed specification of the above numbered patent requiring correction and that the said Letters Patent should read as corrected below.

Column 4, lines 72 to 75, claim 2, the formula should appear as shown below instead of as in the patent:

Signed and sealed this 23rd day of August 1960.

[SEAL]

Attest:
KARL H. AXLINE,
*Attesting Officer.*

ROBERT C. WATSON,
*Commissioner of Patents.*